Patented July 31, 1928.

1,679,211

UNITED STATES PATENT OFFICE.

HENRY B. FABER, OF BUFFALO, NEW YORK, ASSIGNOR TO NATIONAL ANILINE & CHEMICAL COMPANY, INC., OF NEW YORK, N. Y., A CORPORATION OF NEW YORK.

METHOD OF SULFONATION.

No Drawing.      Application filed July 2, 1921. Serial No. 482,140.

This invention relates to an improved method of sulfonation of organic substances, which are normally solid in character.

The sulfonation of organic substances has heretofore been commonly effected by treatment with concentrated or fuming sulfuric acid or oleum. In the case of organic substances normally solid in character, the substance has usually been dissolved or suspended in the sulfuric acid during the sulfonation. Such sulfonation process usually requires the use of an excess of sulfuric acid which remains in admixture with the sulfonic acid at the end of the sulfonation, so that it is necessary to isolate the sulfonic acid from this excess sulfuric acid in order to obtain it in an isolated state. In many cases this isolation is difficult and requires an elaborate and complicated procedure.

The present invention is based upon the surprising discovery that the sulfonation of organic substances normally solid in character can be directly brought about by the action of sulphur-trioxide, in the absence or substantial absence of water, upon the organic solid, so that the sulfonic acid is directly produced in a solid state from the solid material sulfonated.

The invention is of more or less general application, and is of special value in conjunction with the manufacture of dyestuffs and intermediates, for example, dyestuffs of the triphenylmethane series.

The invention will be further illustrated by the following specific example:

Spirit blue (also known as rosaniline blue, aniline blue, opal blue, etc.) was prepared by the phenylation of rosaniline with aniline oil in the presence of benzoic acid, and the resulting product poured into hydrochloric acid whereby a phenylated rosaniline hydrochloride or spirit blue was obtained in the form of a precipitate which was filtered off, dried, and used as the material to be sulfonated.

A mixture of sulphur-trioxide gas and air, obtained by passing dry air through strong oleum, was then passed over the spirit blue, with agitation. The reaction took place at ordinary room temperature, the temperature of the reacton rising slightly to approximately blood heat. After treatment for a period of about two to three hours, the material was withdrawn from the apparatus, and the soluble sulfonated product extracted by boiling with water and separated from the unsulfonated material by filtration. The soluble blue product thus obtained in solution was recovered in a solid form by concentrating and evaporating the solution.

By proceeding in the manner described in the above example, the spirit blue is directly sulfonated in a solid state by the action of gaseous sulphur-trioxide, and the sulfonation is brought about without the use of liquid sulfuric acid, such as is commonly used in the sulfonation of spirit blue for the production of dyes soluble in water or alkali solutions. The use of an excess of sulfuric acid for the sulfonation is thus avoided and the necessity for neutralizaton of this excess is eliminated, while the sulfonation is directly accomplished by allowing the sulphur-trioxide vapor to come into contact with the spirit blue in a solid state.

It is a further advantage of the invention that the sulphur-trioxide that is not used in the process, that is, any excess of sulphur-trioxide that may be used in a gaseous state, can be directly recovered without further treatment for reuse.

A further advantage of the invention is that the sulfonation can be regulated by variation and regulation of the concentration of the sulphur-trioxide, for example, by the use of an inactive gas as a diluent, and with regulation of the relative proportions of sulphur-trioxide and inert gas. By proper control, the concentration of sulphur-trioxide in the gaseous mixture may be maintained substantially constant throughout the reaction.

Instead of sulfonating unsulfonated organic compounds in the manner described, the degree of sulfonation of compounds which have already been partially sulfonated, in order to raise the degree of sulfonation, can similarly be increased. For example, the monosulfonic acid of triphenyl-rosaniline can be further sulfonated to the di, tri-, or tetra-sulfonic compound.

The sulfonation of certain organic compounds, for example, spirit blue to form soluble blue, can be carried out at ordinary room temperature, thus avoiding the necessity for heating to bring about the sulfonation. Where, however, the sulfonation does not readily take place at ordinary temperatures, in the manner above described, the reaction can be promoted by the application of heat, or by the application of pressure, or by using both heat and pressure, as well as by regulating the concentration of the sulphur-trioxide gas employed.

The reaction between the sulphur-trioxide gas and the solid organic substance does not seem to require the presence of water, although the presence of small amounts of moisture does not seem to interfere with the process other than to form some small amount of sulphuric acid which may require subsequent neutralization or removal.

The sulphur-trioxide gas which does not enter into reaction may be recovered and used over again with proper regulation of its concentration, for example, by adding further amounts of sulphur-trioxide thereto to make up for that which has been used up in the sulfonation. The air or other inert gas with which the sulphur-trioxide is mixed may be dried, before use, by suitable dehydrating means, for example, by refrigeration or by the use of a dehydrating agent, such as calcium chloride.

The present invention can advantageously be practiced in conjunction with the contact acid process, by passing the sulphur-trioxide gases from the contact process, with proper regulation of their concentration, directly to the sulfonation chamber, and any sulphur-trioxide that is not utilized can be recovered and used over again.

Where the sulfonation process is one that results in the evolution of a large amount of heat which tends to cause the reaction to go too far or too energetically, this can be prevented by suitable cooling means distributed throughout the material being sulfonated so that the temperature of sulfonation can be thus regulated and controlled.

Inasmuch as the sulphur-trioxide in a gaseous state must come into most intimate contact with the solid substance to be sulfonated, it is of importance to provide the solid substance in a state of fine subdivision, for example, such as is obtained by chemical precipitation or by other method of production, which gives a finely divided product. Where the substance is made up of larger particles and particularly particles which are dense in character, it is difficult for the sulphur-trioxide to act upon more than the outer surfaces of the particles and the amount of sulfonic acid produced may be limited in this way, in which case it will be necessary to extract or otherwise separate the sulfonic acid in order to obtain it in an isolated state. In general, the more finely divided the material treated, the greater the ease with which the sulfonation takes place and the more complete the reaction. With materials which have large particles, the materials can be subjected to a grinding operation while they are being treated with the sulphur-trioxide, for example, in an apparatus similar to a ball mill, so that the grinding or attrition will remove the sulfonated surface layer of the particles and expose fresh surfaces to the action of the sulfur-trioxide gas.

Instead of sulfonating the particular triphenylmethane compound above described, other organic compounds of a solid character can be similarly sulfonated, including other triphenylmethane compounds and compounds other than those of the triphenylmethane series. For example, gaseous sulphur-trioxide can be used for the sulfonation of hydrocarbons or hydrocarbon derivatives, such as amino, hydroxy and nitro derivatives, etc. The process accordingly is not only of more or less general application, but it is a process which can be regulated and controlled to give a partial or fractional sulfonation. The sulfonation can be regulated, for example, by regulating the concentration of the sulphur-trioxide or the temperature and pressure of the sulfonation.

Among other solid organic compounds which can be sulfonated according to the present invention, may be mentioned the sulfonation of malachite green to form Helvetia green, of hydroxytetraethyldiaminotriphenylmethane to form patent blue, the sulfonation of magenta, the sulfonation of naphthylamines to form the corresponding mono or disulfonic acids or even trisulfonic acids, the sulfonation of naphthols, aminonaphthols and dioxynaphthylamines, the sulfonation of anthraquinon compounds, etc.

In the claims, the term "rosaniline substance" includes rosaniline, its homologues and analogues, and their derivatives or substitution-products. It is further understood that the term "a spirit blue", as used in the claims, generically denotes and includes the alcohol soluble N-aryl derivatives of rosaniline substances, while the term "spirit blue" denotes and includes mono-, di-, and triphenylrosaniline, or mixtures of the same, and as bases or as salts.

I claim:

1. The method of sulfonating triarylmethane compounds which comprises subjecting the same in a solid state to the action of sulphur trioxide in the vapor phase.

2. The method of sulfonating rosaniline substances, which comprises subjecting the same in a solid state to the action of sulphur trioxide in the vapor phase.

3. The method of sulfonating rosanline substances, which comprises subjecting the same in a solid state to the action of a mixture of gaseous sulphur trioxide and an inert gas.

4. The method of sulfonating spirit blue which comprises subjecting the same in a solid state to the action of sulphuric anhydride in the vapor phase.

5. The method of sulfonating spirit blue which comprises subjecting the same in the solid state to the action of a mixture of gaseous sulphur trioxide and air.

6. The method of sulfonating alcohol soluble organic coloring matters which comprises subjecting the same in a solid state to the action of gaseous sulfur trioxide.

7. The method of sulfonating a spirit blue which comprises subjecting the same in a solid state to the action of gaseous sulfur trioxide.

In testimony whereof I affix my signature.

HENRY B. FABER.